United States Patent
Moenkemoeller

(10) Patent No.: US 8,378,692 B2
(45) Date of Patent: Feb. 19, 2013

(54) OPERATING DEVICE AND METHOD FOR GENERATING OUTPUT SIGNALS THEREFROM

(75) Inventor: Ralf Moenkemoeller, Guetersloh (DE)

(73) Assignee: paragon AG, Delbrueck (DE)

( * ) Notice: Subject to any disclaimer, the term of this patent is extended or adjusted under 35 U.S.C. 154(b) by 720 days.

(21) Appl. No.: 12/529,196

(22) PCT Filed: Jan. 30, 2008

(86) PCT No.: PCT/EP2008/000686
§ 371 (c)(1),
(2), (4) Date: Sep. 7, 2009

(87) PCT Pub. No.: WO2008/107047
PCT Pub. Date: Sep. 12, 2008

(65) Prior Publication Data
US 2010/0033193 A1    Feb. 11, 2010

(30) Foreign Application Priority Data

Mar. 7, 2007 (DE) .......................... 10 2007 011 064

(51) Int. Cl.
*G01R 27/28* (2006.01)
*G01R 29/26* (2006.01)
(52) U.S. Cl. ........................ 324/612; 324/613
(58) Field of Classification Search ............. 324/612, 324/613
See application file for complete search history.

(56) References Cited

U.S. PATENT DOCUMENTS

| 4,864,241 | A  | * | 9/1989  | Goldie ........................ 324/318 |
| 5,170,493 | A  | * | 12/1992 | Roth ............................ 455/82 |
| 6,518,712 | B2 | * | 2/2003  | Weng ....................... 315/209 R |
| 7,423,699 | B2 | * | 9/2008  | Vorenkamp et al. .......... 348/726 |
| 7,877,169 | B2 | * | 1/2011  | Slota et al. .................... 700/286 |

FOREIGN PATENT DOCUMENTS

WO    WO-03078871    9/2003

* cited by examiner

*Primary Examiner* — Jeff Natalini
(74) *Attorney, Agent, or Firm* — Andrew Wilford

(57) ABSTRACT

The invention relates to an operating device (1) with an adjustable lever (2) and a sensor mechanism (8), comprising a transmitter coil (5), which may be energized with an alternating current by means of an alternating current supply (7) and a receiver coil arrangement (9). According to the invention, such an operating device may be designed such as to be reliably useful even with intense interference with a construction as technically simple as possible without complex screening measures, wherein the frequency of the alternating current energizing the transmitter coil (5) and the pass frequency of a receiver filter (13) in the receiver coil arrangement (9) are synchronously changed according to a preset program by means of a control unit (14), such that, by means of the operating device (1) and the method carried out therewith, a change to a frequency which is interference or interference signal free can be continuously carried out.

13 Claims, 1 Drawing Sheet

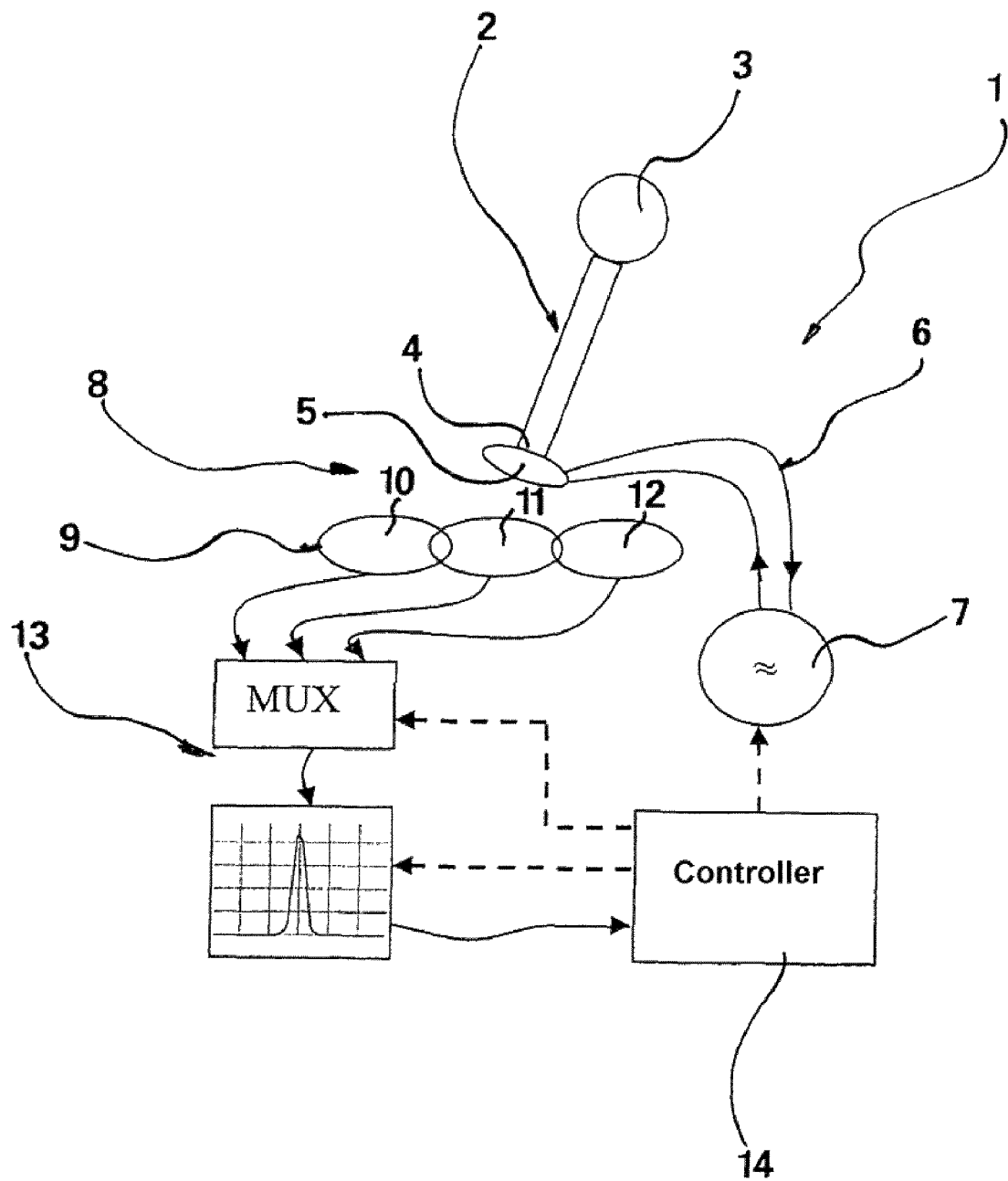

OPERATING DEVICE AND METHOD FOR GENERATING OUTPUT SIGNALS THEREFROM

CROSS REFERENCE TO RELATED APPLICATIONS

This application is the US-national stage of PCT application PCT/EP2008/000686, filed 30 Jan. 2008, published 12 Sep. 2008 as WO2008/107047, and claiming the priority of German patent application 102007011064.4 itself filed 7 Mar. 2007, whose entire disclosures are herewith incorporated by reference.

FIELD OF THE INVENTION

The invention relates to an operating device with a movable lever and a sensor mechanism, comprising a transmitter coil that may be energized with an alternating current from an alternating-current supply, and a receiver-coil assembly, and to a method for generating output signals with such operating device, in which the transmitter coil is energized with alternating current, and the transmitter coil and the receiver-coil assembly are moved relative to each other such that signals are generated in the receiver-coil assembly.

The transmitter coil of such an operating device, or of a corresponding method, is actively supplied with current. Hence, the coil works with significantly higher useful signals than passive operating devices known from prior art for which no electrical connection of the transmitter coil to a power supply is provided. The latter known operating devices may work based on the transponder principle, that is a voltage is induced, and a corresponding signal is sent back. In operating devices that work according to a further principle known from the prior art, a current passes through antenna coils and the variations in induced current caused by the electromagnetic coupling of the transmitter coil are analyzed. Furthermore, the prior art proposes operating devices that use magnetic damping mechanisms instead of transmitter coils, which cause changes in the receiving coils as a result of the magnetic coupling. Passive operating devices have in common that analyzable signal changes are relatively small. This requires sensitive recording circuits that quickly overload with relatively intense interference signals and that can render the entire operating device inoperative.

For example in the automobile sector only operating devices that must guarantee a very high availability for security reasons may be utilized, although intense interference signals may simultaneously occur during operation. This necessitates screening is measures with at least a technically complex design for the established passive operating devices described above. Concerning the above-described operating device it must be stated that the device works with significantly higher useful signals than the passive operating devices described above due to the active current feed of its transmitter coil. In the case of the operating device that works with active current feed, the transmitter coil is energized with signal amplitudes of several volts, whereas the above-described passive operating devices work with signal amplitudes in the low millivolt range.

OBJECT OF THE INVENTION

The object of the invention is to further develop the above-described operating device, or a method for generating an output signal that can be realized by the device, such that the device, or the method, can also be utilized in environments, for example in the automobile sector, in which intense interference can occur at many different frequencies.

SUMMARY OF THE INVENTION

Concerning the operating device, this object is attained in that the frequency of the alternating current energizing the transmitter coil and the pass frequency of a receiver filter in the receiver-coil assembly can be synchronously changed in accordance with a preset program by a controller. Accordingly, the solution, in terms of the method for generating output signals from an operating device, is found by synchronously changing the frequency of the alternating current energizing the transmitter coil and the pass frequency of a receiver filter in the receiver-coil assembly in accordance with a preset program. Advantageously, the transmitter coil is fixed on the lever and movable by the lever relative to the stationary receiver-coil assembly.

A particularly advantageous embodiment of the operating device according to the invention is that the transmitter coil is mounted at an end of the lever opposite the actuating part of the lever and the receiver-coil assembly is provided below the end. This way, the sensor mechanism of the operating device according to the invention may be integrated into established operating devices without technically complex design measures, and without the need to fundamentally redesign the established operating devices.

If the receiver filter in the receiver-coil assembly is designed with an extremely narrow band and most accurately set to the frequency of the alternating current energizing the transmitter coil, a high degree of immunity to interferences or interference signals that do not lie very narrowly or very close to the frequency of the oscillator circuit of the current supply can be achieved.

In order to be able to continue to use the operating device according to the invention in the range of a frequency set for the alternating current energizing the transmitter coil and the receiver filter in the receiver-coil assembly without a great deal of effort when interferences or interference signals occur, it is advantageous if the frequency of the alternating current and the pass frequency of the receiver filter are synchronously changed in a program-controlled manner until a frequency free of interference or interference signals is found. Thus, in the case of the operating device according to the invention, or the corresponding method according to the invention, a shift is automatically made to a free frequency not impacted by interference signals.

Pursuant to a further advantageous embodiment, the controller of the operating device according to the invention is configured such that the frequency of the alternating current and the receiver filter can be changed periodically, and that only signals of the receiver-coil assembly captured at frequencies free of interference or interference signals can be analyzed to generate an output signal from the operating device. This way, the output of any output signals by the operating device that are based on distorted measuring signals can definitely be eliminated. Moreover, by internally comparing the captured signals of different frequencies distorted frequencies can be detected. To the extent that individual frequencies are permanently distorted it is possible to ensure that signals captured at these frequencies are not taken as the basis for generating output signals when operating the operating device.

Advantageously, the receiver filter of the operating device according to the invention may comprise a full-wave rectifier.

The alternating-current supply of the operating device according to the invention may be provided with an oscillator circuit based on a design with little complex technical construction.

When implementing the method according to the invention, the transmitter coil may be advantageously energized with alternating current with signal amplitudes ranging from one to several volts, so that the method according to the invention is significantly more robust compared to the prior art due to the higher proportion of useful signals.

In the event of interferences or interference signals, the frequency of the alternating current or the receiver filter can be synchronously changed in a program-controlled manner with the method according to the invention until a frequency free of interference or interference signals is set.

To make the method according to the invention even more secure, the frequency of the alternating current and the receiver filter can be changed periodically. The signals from the receiver-coil assembly are captured at different frequencies, and an output signal from the operating device is generated, or calculated, only from such signals of the receiver-coil assembly that were captured at frequencies free of interference or interference signals.

A further increase in security of the method according to the invention can be achieved if an output signal from the operating device is generated only when a signal from the receiver-coil assembly with a predetermined number of different frequencies of the alternating current and the receiver filter yields the same result.

BRIEF DESCRIPTION OF THE DRAWING

The invention will be explained in greater detail below with reference to an embodiment shown in the drawing, whose sole FIGURE represents a basic embodiment of an operating device according to the invention.

DETAILED DESCRIPTION

An embodiment of an operating device 1 according to the invention shown in the only FIGURE comprises a lever 2 that can be moved in different directions. The gearshift or lever 2 comprises an actuating part 3 shaped as a round knob in the illustrated embodiment to actuate the lever 2. By sliding the actuating part 3 the lever 2 can pivot or swivel about a fixed point, with pivoting or swiveling movements possible in different directions.

At its end 4 opposite the actuating part 3 the lever 2 is provided with a transmitter coil 5 that changes its spatial position in the operating device 1 according to the movement of the lever 2 by its actuating part 3.

In the case of the operating device 1 according to the invention the transmitter coil 5 is actively supplied with current, here energized with alternating current. To this end, the transmitter coil 5 is connected to an alternating-current supply 7 through a supply line 6. Since the transmitter coil 5 is actively supplied with current, it works with significantly higher useful signals than such components of passive systems. The transmitter coil 5 is energized with signal amplitudes in the range of several volts, whereas the corresponding signal amplitudes of passive systems are in the range of relatively low millivolts. In the case of the illustrated embodiment shown in the only FIGURE, an oscillator is part of the alternating-current supply 7.

In addition to the transmitter coil 5, a sensor mechanism 8 of the operating device 1 has a receiver-coil assembly 9 that is formed by three receiver coils 10, 11, and 12 in the case of the embodiment of the operating device 1 according to the invention shown in the only FIGURE.

The alternating current generated by the alternating-current supply 7—the latter being equipped with the oscillator—energizes the transmitter coil 5 of the lever 2. The alternating current passing through the transmitter coil 5 magnetically induces an alternating current with the same frequency in the receiver coils 10, 11, and 12 of the receiver-coil assembly 9.

A receiver filter 13 having an adjustable pass frequency is provided downstream of the receiver-coil assembly 9. A controller 14 synchronizes the pass frequency of the receiver filter 13 and the frequency of the alternating current generated by the alternating-current supply 7 according to a quasi arbitrarily preset program, serves to adjust the pass frequency of the receiver filter 13 and the frequency of the alternating current generated by the alternating-current supply 7.

The pass frequency of the receiver filter 13 assigned to the receiver-coil assembly 9 establishes an extremely narrow passband accurately adjusted to the frequency of the oscillator circuit of the alternating-current supply 7. Thus, the operating device 1 is highly immune to signal interferences that are not close to the frequency of the oscillator circuit.

If a strong interference signal occurs near or at the frequency of the oscillator circuit, a signal evaluation done by the controller 14 determines that the measured signal influenced by the interference signal is incorrect. Comparing the captured signal with a reference curve stored in the controller 14 serves this purpose.

As soon as the controller 14 detects the presence of an interference signal on the frequency preset or set for the alternating current generated by the alternating-current supply 7 and for the pass frequency of the receiver filter 13, the frequency of the alternating current and the pass frequency of the receiver filter 13 are synchronously changed on the basis of a preset program and under the program control of a microprocessor of the controller 14, until an undisturbed signal is received again. The operating device 1 effectively switches to a frequency free of interference.

Furthermore, the frequency of the alternating current and the passband of the receiver filter 13 can continuously and periodically be changed such that captured signals can be scanned and evaluated at different frequencies. Frequencies energized by interference signals can be detected in a simple manner through an internal comparison of the measuring results that takes place in the controller 14 at different frequencies.

By implementing a majority evaluation in the controller 14, valid output signals from the controller 14 can only be emitted if the measurements undertaken at a defined number of different frequencies, or the measuring signals captured during this process, yield the same measuring result.

In the case of the described illustrated embodiment of the operating device 1 according to the invention the receiver filter 13 in the receiver-coil assembly 9 has a full-wave rectifier.

When implementing the method for generating output signals from the operating device 1 according to the invention, the transmitter coil 5 is energized with alternating current. Furthermore, the transmitter coil 5 is moved relative to the receiver-coil assembly 9 provided under it. This way, signals that change according to the movement of the transmitter coil 5 are generated in the receiver coils 10, 11, and 12 of the receiver-coil assembly 9. The frequency of the alternating current energizing the transmitter coil 5 and the pass frequency of the receiver filter 13 in the receiver-coil assembly 9 are synchronously changed by the controller 14 according to the preset program. The synchronous change of the above-described frequencies takes place at least whenever the controller 14 detects the presence of interference in the range of the frequency that was just set.

In the illustrated embodiment as shown the frequency of the alternating current and the pass frequency of the receiver filter 13 are changed periodically and, accordingly, the signals received by the receiver-coil assembly 9 are captured at different frequencies. An output signal from the operating device 1 is generated, or calculated, only from such captured signals of the receiver-coil assembly 9 that were captured at frequencies free of interference or interference signals.

In a further refinement of the method according to the invention, the operating device 1 emits an output signal only when signals from the receiver-coil assembly 9 captured in the controller 14 are present at a majority of different frequencies and show the same result.

The invention claimed is:

1. An operating device with a movable lever and a sensor mechanism, the device comprising
    a transmitter coil;
    means for energizing the transmitter coil with an alternating current from an alternating-current supply;
    a receiver-coil assembly having a band-pass filter with a variable pass frequency; and
    means for controlling the frequency of the alternating current energizing the transmitter coil and the pass frequency of the receiver filter synchronously according to a preset program.

2. The operating device in accordance with claim 1 wherein the transmitter coil is attached to the lever, and the lever is movable, and receiver-coil assembly is stationary.

3. The operating device in accordance with claim 2 wherein the transmitter coil is mounted at an end of the lever opposite an actuating part of the lever, and the receiver-coil assembly is provided below the end.

4. The operating device in accordance with claim 1 wherein the filter in the receiver-coil assembly has a narrow pass band and is accurately adjusted by the control means to the frequency of the alternating current energizing the transmitter coil.

5. The operating device in accordance with claim 1 wherein the controller is embodied such that, in case of interference at a frequency of the alternating current energizing the transmitter coil and of the filter of the receiver-coil assembly, the frequencies of the alternating current and of the band-pass filter can be synchronously changed in a program-controlled manner until a frequency free of interference or interference signals is found.

6. The operating device in accordance with claim 1 wherein the controller is embodied such that the frequency of the alternating current and the filter can be changed periodically and that only signals of the receiver-coil assembly captured at frequencies free of interference are analyzed for generating an output signal from the operating device.

7. The operating device in accordance with claim 1 wherein the filter of the receiver-coil assembly has a full-wave rectifier.

8. The operating device in accordance with claim 1 wherein the alternating-current supply includes an oscillator circuit.

9. A method for generating output signals from an operating device, the method comprising the steps of:
    energizing with an alternating current a transmitter coil movable relative to a receiver-coil assembly;
    moving the transmitter coil and a receiver-coil assembly relative to each other such that signals are generated in the receiver-coil assembly having a band-pass filter with a variable pass frequency; and
    synchronously changing the frequency of the alternating current energizing the transmitter coil and the pass frequency of the band-pass filter in the receiver-coil assembly according to a preset program.

10. The method in accordance with claim 9 wherein the transmitter coil is energized with alternating current with a signal amplitude ranging from one to a plurality of volts.

11. The method in accordance with claim 9 wherein, in case of interferences or interference signals, the frequency of the alternating current and the pass frequency can be synchronously changed in a program-controlled manner until a frequency free of interference or interference signals is set.

12. The method in accordance with claim 9 wherein
    the frequency of the alternating current and the pass frequency is changed periodically,
    the signals from the receiver-coil assembly are captured at the different frequencies, and
    an output signal from the operating device is generated or calculated only from such signals of the receiver-coil assembly that were captured at frequencies free of interference or interference signals.

13. The method in accordance with claim 9 wherein an output signal from the operating device is generated only if a signal from the receiver-coil assembly with a predetermined number of different frequencies of the alternating current and the filter yields the same result.

* * * * *